United States Patent
Van Den Oetelaar

(10) Patent No.: US 7,394,751 B2
(45) Date of Patent: Jul. 1, 2008

(54) OPTICAL STORAGE SYSTEM OPTICAL STORAGE MEDIUM AND USE OF SUCH A MEDIUM

(75) Inventor: Ronald Joseph Antonius Van Den Oetelaar, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 735 days.

(21) Appl. No.: 10/497,047

(22) PCT Filed: Dec. 2, 2002

(86) PCT No.: PCT/IB02/05084

§ 371 (c)(1),
(2), (4) Date: May 28, 2004

(87) PCT Pub. No.: WO03/049098

PCT Pub. Date: Jun. 12, 2003

(65) Prior Publication Data

US 2005/0036440 A1 Feb. 17, 2005

(30) Foreign Application Priority Data

Dec. 3, 2001 (EP) .................................. 01204696

(51) Int. Cl.
*G11B 7/24* (2006.01)
(52) U.S. Cl. .................................. 369/275.5; 428/64.4
(58) Field of Classification Search ............. 369/275.5, 369/13.53, 300, 275.1–275.4, 283, 288; 428/64.1–64.5; 720/718
See application file for complete search history.

(56) References Cited

U.S. PATENT DOCUMENTS

| | | | | |
|---|---|---|---|---|
| 5,125,750 A | * | 6/1992 | Corle et al. | 359/819 |
| 5,279,877 A | * | 1/1994 | Uchiyama et al. | 428/825.1 |
| 6,309,726 B1 | * | 10/2001 | Ono et al. | 428/64.1 |
| 6,775,838 B2 | * | 8/2004 | Komaki et al. | 720/718 |

* cited by examiner

*Primary Examiner*—Ali Neyzari

(57) ABSTRACT

A description is given of an optical storage system comprising an optical storage medium (1) and an optical head device (6). The medium has a substrate (2), a recording stack (3) and an optically transparent protective coating stack (4 and 5), for protecting the recording stack from impact by the optical head device (6). The protective coating stack comprises a multi-layer (4 and 5) of at least: a first layer (5) with a thickness smaller than 40 nm and a surface with a surface energy smaller than 1.5 J/m$^2$, and a second layer (4), adjacent the first layer (5), with a Young's modulus E smaller than 10 GPa and larger than 0.001 GPa. This combination of layers (4 and 5) is very resistant to damage caused by mechanical impact of the optical head device (6). No lubricants are required.

13 Claims, 1 Drawing Sheet

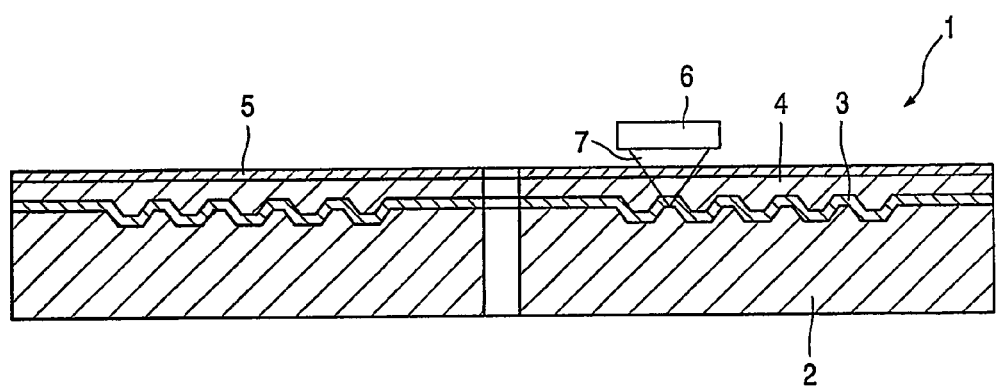

OPTICAL STORAGE SYSTEM OPTICAL STORAGE MEDIUM AND USE OF SUCH A MEDIUM

The invention relates to an optical storage system comprising an optical storage medium and an optical head device, the medium comprising a substrate with deposited on at least one side thereof:
- a recording stack having at least one recording layer for recording by means of a focused radiation beam, having a predetermined wavelength and having a predetermined numerical aperture, emanating from the optical head device,
- a protective coating stack, between the recording stack and the optical head device, for protecting the recording stack from impact by the optical head device.

The invention further relates to an optical storage medium for use in such an optical storage system.

The invention further relates to the use of such an optical recording medium.

An embodiment of an optical storage system of the type mentioned in the opening paragraph is known from European Patent Application EP 0 971 344 A1.

A further increase in data capacity of optical storage media will require the writing and reading of smaller data markings on the medium which in its turn requires a very small spacing between an optical head device and the medium, e.g. a disk. This is because a decrease of the size of the data markings on the medium requires the lens system of the optical head device to have a relatively high numerical aperture (NA), e.g. >0.8. Such small head-disk spacing may either be achieved with so-called slider technology or actuator based technology. In the first technology a slider, e.g. known from hard disk drives, typically flies above a flat surface of a storage medium at a height of several wavelengths $\lambda$ of the radiation beam or smaller. The use of slider technology for optical storage systems implies that such an optical storage system is no longer a truly non-contact system, i.e. contact between the head and optical recording medium will occur every now and then, e.g. during start-up. In hard disk drives, the occasional contact between head and disk is significantly reduced using a lubricant and hardcoat on top of the recording layer. The lubricant film that is present on hard disk media has a multifunctional purpose: it acts as a cushion by dissipating part of the head-disk impact energy, it helps to passivate the disk surface against contamination and it minimizes wear. In said European patent application a carboxylic acid amine salt, acting as a lubricant, is used on top of a surface layer of an inorganic material, such as $SiN_x$, $SiO_x$ or SiC, with a thickness of specifically 100 nm. Without the use of said lubricant the surface of the medium of said European patent application shows great and deep flaws after a damage test in which a shock of collision between the optical disk surface and an optical head device is deliberately caused in a controlled manner. With said lubricant damage is greatly counteracted and no or very slight damage is visible after said test. However, the use of lubricants is not necessarily compatible with optical recording, due to pollution by the lubricant of optical components in the radiation-path. It is a disadvantage of the known system that it requires a lubricant on the surface of the medium.

It is therefore an object of the present invention to provide an optical storage system of the kind described in the opening paragraph, which has an optical storage medium with a surface capable of preventing damage by impact of the optical head device of the system but which surface is free from lubricants or other non-durable, easily pollutable coatings thereon.

According to the invention this object is achieved with an optical storage system, which is characterized in that the protective coating stack comprises a multi-layer of at least:
- a first layer, being present most remote from the recording stack, said first layer having a thickness smaller than 40 nm and having a surface with a surface energy smaller than 1.5 J/m²
- a second layer, adjacent the first layer, said second layer having a Young's modulus E smaller than 10 GPa and larger than 0.001 GPa.

A multi-layer protective coating, also called capping stack, is present on top of the recording stack. The capping stack has at least two layers. The first layer is relatively thin and therefore has low mechanical stress and is highly compliant with the underlying second layer. Furthermore, the first layer has a low surface energy, i.e. a passive surface, to prevent sticking of the optical head device, e.g. a slider, and/or contaminants to the surface of the optical medium. The second layer has a relatively low Young's modulus, i.e. high elasticity. Furthermore, the second layer acts as a thermal barrier between the recording layer and the surface of the optical medium in order to prevent radiation beam induced thermal instabilities in the optical (servo) signals used during reading and writing information. To protect the head during contact with the disk, the surface of the disk can be covered by an elastic layer, which will act as a cushion by dissipating a large part of the head-disk impact energy in case of collision. However, such an elastic layer alone is easily damaged. Furthermore, elastic materials tend to have a rather high surface energy resulting in sticking of the head to the disk. According to the invention it is the combination of the relatively thin first layer and the elastic second layer which combination is very robust against impacts of, e.g. the optical head device, with very little or no damage to the protective coating stack and the underlying recording stack and/or substrate. When the Young's modulus of the second layer becomes smaller than 0.001 GPa the first layer may be exposed to too high deformations resulting in damage of the first layer. Therefore, the Young's modulus of the first layer should be larger than 0.001 GPa.

In a preferred embodiment the material of the first layer has a pencil hardness of H or harder. By using a relatively hard layer surface damage of the first layer during incidental contact with the optical head device is counteracted. In a preferred embodiment the first layer has a thickness smaller than 20 nm or even smaller than 10 nm. A relatively low thickness results in a very compliant layer with low mechanical stress, especially useful when using hard layers, which easily crack at relatively large thicknesses. Therefore, since the second layer can be easily elastically deformed, the first layer preferably is relatively thin in order to limit the formation of cracks or other damage to this layer during impact with an optical head device.

In a preferred embodiment the first layer has an electrical resistance smaller than $10^{13}$ $\Omega$/square. Below this level of resistance the layer has antistatic properties and the attraction and adhesion of dust particles or the like is diminished because electrostatic charge build up is counteracted.

The second layer preferably has a thickness smaller than 125 µm. A too large thickness would easily introduce optical aberrations of the focused radiation beam resulting in a distorted read or write spot. Furthermore, the use of a high NA of the radiation beam becomes troublesome at a too large thickness of the second layer.

The second layer preferably has a Young's modulus E smaller than 1 GPa. A Young's modulus smaller than 1 GPa has the advantage that the cushion action and mechanical energy dissipation capability of the layer is further improved.

In a special embodiment the second layer has a thickness smaller than 30 μm. The optical storage medium, for example, may be a magneto-optical disk. If the thickness of the second layer is larger than 30 μm, the resulting distance between the magneto-optical recording layer and the magnetic-field-modulation coil in the read/write head leads either to a too large reduction in magnetic field at the recording layer, or to a coil with a too high self-inductance and resistance to attain significant data rates.

In a favorable embodiment the second layer comprises an UV-light curable acrylic resin. Spin coating, which is a frequently used and easily implemented deposition technique, may form such a layer.

The first layer preferably comprises a material selected from the group of silicon nitride, silicon oxide, silicon oxynitride and diamond-like carbon (DLC). These materials have excellent wear-resistant properties, and doping with other atoms can control their surface conductivity and surface energy.

Preferably, the first layer has a surface stress exceeding a critical surface stress of the second layer. If the surface stress of the first layer is larger than a critical surface stress of the second layer, the surface of the optical storage medium will deform resulting in an increased surface roughness. A too large surface roughness will adversely affect the optical signal coming from optical storage medium. However, a slight surface roughness can be advantageous since this will result in a reduction of the contact area between e.g. an optical head device and medium surface during impact. The surface stress of the first and second layer can thus be tuned to create an optical storage medium with a limited surface roughness. Limited surface roughness means that the optical signal from the optical disk is not or only slightly affected, while the contact area between optical head device and medium during impact is significantly reduced.

An embodiment of an optical storage system according to the invention will be described with reference to the drawing in FIG. 1. It should be noted that the drawing is schematic and not to scale.

FIG. 1 shows a cross-section of an embodiment of the optical storage system comprising an optical disk, an optical head device and a radiation beam that is focused onto the recording stack of the optical disk.

In FIG. 1 the optical storage system comprises an optical storage medium 1 that has a substrate 2. On a side thereof is deposited a recording stack 3 having at least one recording layer. A focused radiation beam 7, having a predetermined wavelength and having a predetermined numerical aperture, emanates from an optical head device 6. An optically transparent protective-coating stack 4 and 5 between the recording stack 3 and the optical head device 6 protects the recording stack 3 from impact by the optical head device 6. The protective coating stack 4 and 5 comprises a first layer 5, which has a thickness of 9 nm. The first layer 5 is made of the material $Si_3N_4$ and has a surface with a surface energy smaller than 1.5 $J/m^2$. The pencil hardness of $Si_3N_4$ is harder than H. A second layer 4 is made of the resinous material Daicure Clear EX-860 manufactured by Dainippon Ink & Chemicals Inc. It has a Young's modulus E of about 0.05 GPa. Spin-coating and subsequent UV-curing, which method is well known in the art, forms the layer 4, which has a thickness of 15 μm. The present invention is not limited to this material. Other materials with a Young's modulus smaller than 10 GPa, for instance polymers or filled polymers, may also be applied. Second layer 4 may also be formed by adhering a sheet of transparent plastic, e.g. polycarbonate (PC) or polymethylmethacrylate (PMMA) provided with a layer of pressure sensitive adhesive (PSA), to the recording stack 3. First layer 5 is formed on second layer 4 by sputtering. The stoichiometry of $Si_3N_4$ may deviate slightly due to variation in sputtering conditions. The surface energy of layer 5 can be lowered by hydrogenation. Other possible materials, which may be used as the first layer 5 are silicon oxide, silicon oxynitride and diamond-like carbon (DLC), which have excellent wear-resistant properties. However, the present invention is not limited to these materials.

The surface energy of the materials of the first layer 5 should be smaller than 1.5 $J/m^2$, preferably smaller than 0.75 $J/m^2$, and more preferably smaller than 0.1 $J/m^2$.

Substrate 2 has a depression pattern corresponding to a servo pregroove or information signals. Substrate 2 can, for instance, be made by injection molding of a resin, exemplified by polycarbonate (PC), or by injection molding of an UV-curable resin on a glass layer. The recording stack 3 is obtained by depositing, e.g. by sputtering subsequent layers on the surface of substrate 2 on which the depression pattern has been formed. The recording stack 3 may comprise a so-called phase-change recording layer, a magneto-optical recording layer or a dye layer. Other types of recording layers, e.g. fluorescent layers, are not excluded. Read-only (ROM) type layers, e.g. metals like aluminium, may also be used. Examples of phase-change materials are metals and alloys comprising one or more of, e.g. the elements Ge, Sb, In, Ga, Ag and Te. Examples of magneto-optical materials are alloys comprising e.g. Te, Ge, Fe and Co. The present invention can also be applied to magneto-optical recording systems with domain expansion read-out techniques, such as magnetic amplifying magneto-optical system (MAMMOS) or domain wall displacement detection (DWDD).

If the surface stress of first layer 5 is larger than a critical surface stress of second layer 4, the surface of optical storage medium 1 will deform resulting in an increased surface roughness. A large surface roughness will adversely affect the optical signal coming from optical storage medium 1 as read out by the optical head device 6. However, a slight surface roughness can be advantageous since this will result in a reduction of the contact area between head and slider during impact. The surface stress of layers 5 and 4 can thus be tuned to create an optical disk with a limited surface roughness. Limited surface roughness means that the optical signal from the optical disk 1 is not or only slightly affected, while the contact area between head and disk during impact is significantly reduced.

The resistance against damage of the preferred embodiment of the system by impact of the optical head device 6 was tested by impact of a glass slider, e.g. 6, onto the optical storage medium 1. If layers 4 and 5 are not present, the surface of the optical storage medium 1 is severely damaged by impact with the glass slider 6. If only layer 5 is not present, impact of the glass slider 6 results in visible permanent damage to surface of the optical storage medium 1 as well as extremely strong sticking of the slider onto the surface of the optical storage medium 1. If only layer 4 is not present, the glass slider is visibly damaged upon impact with the optical storage medium 1. If both layers 4 and 5 are present, no clear visible damage could be observed upon impact, neither on the optical storage medium 1 nor the glass slider 6.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising", "comprise" or "comprises" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

According to the invention an optical storage system, comprising an optical storage medium and an optical head device, is provided. The medium is provided with a protective layer, which is very resistant to impact of the optical head device without the use of lubricants.

The invention claimed is:

1. An optical storage system comprising an optical storage medium and an optical head device, the medium comprising a substrate having deposited on at least one side thereof:
   a recording stack having at least one recording layer for recording by means of a focused radiation beam, the focused radiation beam having a predetermined wavelength and a predetermined numerical aperture, emanating from the optical head device; and
   an optically transparent protective coating stack, between the recording stack and the optical head device, for protecting the recording stack from impact by the optical head device, characterized in that the protective coating stack comprises a multi-layer of at least:
   a first layer being present most remote from the recording stack, said first layer having a thickness smaller than 40 nm, and a surface with a surface energy smaller than 1.5 J/m$^2$; and
   a second layer adjacent the first layer, said second layer having a Young's modulus E smaller than 10 GPa and larger than 0.001 GPa.

2. The optical storage system as claimed in claim 1, wherein the material of the first layer has a pencil hardness H or harder.

3. The optical storage system as claimed in claim 1, wherein the first layer has a thickness smaller than 20 nm.

4. The optical storage system as claimed in claim 1, wherein the first layer has a thickness smaller than 10 nm.

5. The optical storage system as claimed in claim 1, wherein the surface of the first layer has an electrical resistance smaller than $10^{13}$·s/square.

6. The optical storage system as claimed in claim 1, wherein the second layer has a thickness smaller than 125·m.

7. The optical storage system as claimed in claim 1, wherein the second layer has a Young's modulus E smaller than 1 GPa.

8. The optical storage system as claimed in claim 6, wherein the second layer has a thickness smaller than 30·m.

9. The optical storage system as claimed in claim 6, wherein the second layer comprises an UV-light curable acrylic resin.

10. The optical storage system as claimed in claim 1, wherein the first layer comprises a material selected from the group of silicon nitride, silicon oxide, silicon oxynitride and diamond-like carbon (DLC).

11. The optical storage system as claimed in claim 1, wherein the first layer has a surface stress exceeding a critical surface stress of the second layer.

12. An optical storage medium as described in the optical storage system as claimed in claim 1.

13. Use of an optical storage medium in the optical storage system as claimed in claim 1 in high density optical recording applications, in which the optical head device, during reading and writing in the medium, is present at a distance closer than 0.2 mm to the surface of the medium.

* * * * *